Aug. 2, 1955 J. T. RODDY 2,714,539
LUBRICATING MEANS FOR ELECTRIC MOTOR SHAFT THRUST COLLARS
Filed Jan. 2, 1952
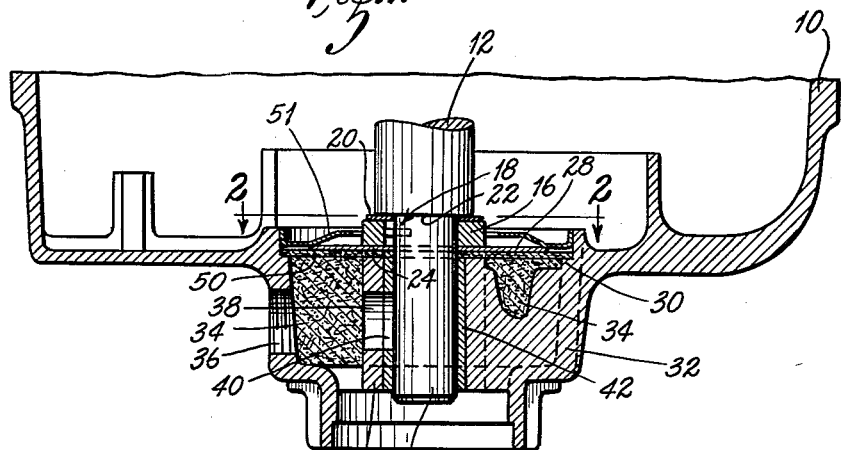
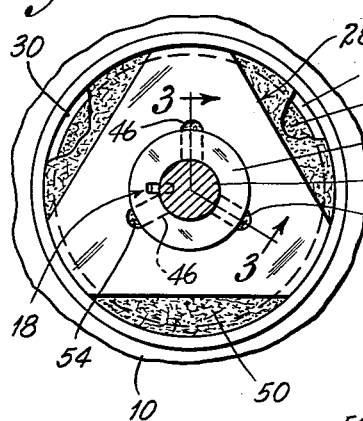
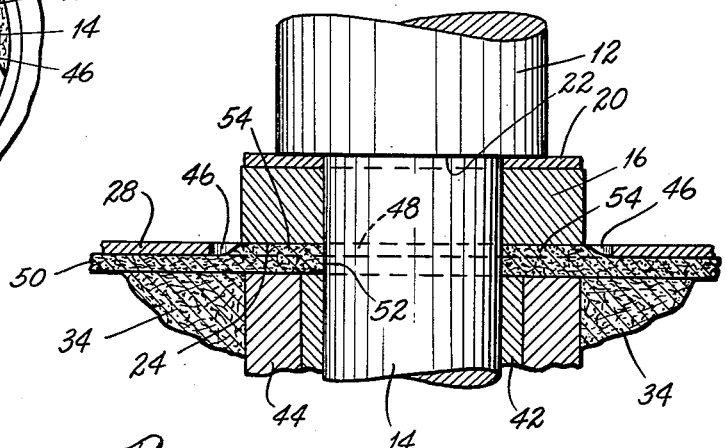
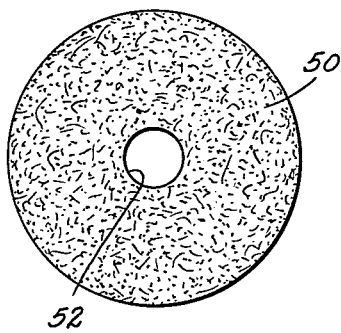
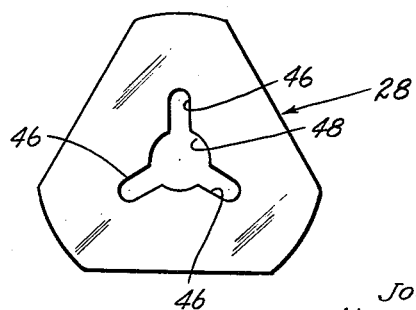
INVENTOR:
JOSEPH T. RODDY,
BY Kingsland, Rogers & Ezell
ATTORNEYS

United States Patent Office 2,714,539
Patented Aug. 2, 1955

2,714,539

LUBRICATING MEANS FOR ELECTRIC MOTOR SHAFT THRUST COLLARS

Joseph T. Roddy, Overland, Mo., assignor to The Emerson Electric Manufacturing Company, St. Louis, Mo., a corporation of Missouri Application January 2, 1952, Serial No. 264,376

3 Claims. (Cl. 308—134.1)

The present invention relates to improved means for lubricating the bearing surface of a thrust collar included in an electric motor construction.

More specifically, the invention is directed to the provision of means for positively lubricating the thrust collar of an electric motor shaft, particularly when the motor is operatively installed in a non-horizontal position. Heretofore, and especially when perpendicularly mounted, the thrust collar associated with the motor shaft was subjected to considerable wear, requiring replacement thereof from time to time for efficient motor performance. The primary reason for damage to said thrust collar has been the absence of positive means for supplying lubricant to that portion thereof which frictionally bears against a steel plate included in the motor assembly.

The primary object of the instant invention is the provision of simple effective means, which may be incorporated in a standard motor assembly without requiring any structural changes in the latter, for providing constant lubrication between said thrust collar and said plate.

The lubricant supplied to the bearing surface of the thrust collar is transmitted thereto by way of an annular compressible and resilient felt washer interposed between a notched steel plate and a lubricant permeated packing contained in a reservoir, or hollow extension, of the motor casing, as will appear.

For a more comprehensive understanding of the invention, the detailed description thereof to follow is augmented by the accompanying drawing wherein:

Fig. 1 is a transverse sectional view of the lower end portion of an electric motor casing and the rotary shaft supported therein, the motor being suspended or mounted in an axially perpendicular position, and the elements comprising the instant invention being in position about a journal portion of said shaft;

Fig. 2 is a plan view, partly in horizontal section, taken on the line 2—2 in Fig. 1, a cup-shaped member being omitted for clarity of details;

Fig. 3 is a fragmentary vertical sectional view on a greatly enlarged scale, taken on line 3—3 in Fig. 2, and illustrating the manner in which the invention attains its objectives;

Fig. 4 is a plan view of the lubricating washer included in the invention; and

Fig. 5 is a plan view of a thin metallic plate provided, in accordance with the teaching of the present invention, with a series of radial notches extending from a circular central opening therein, and designed for interposition between a thrust collar associated with the motor shaft, and the washer portrayed per se in Fig. 4.

In Fig. 1 of the drawing, an end portion of a conventional electric motor casing is portrayed in a typifying sense and designated by numeral 10.

It is to be understood that the invention is directed to the attainment of its objectives primarily when an electric motor is operatively installed in an axially perpendicular, or at least non-horizontal position. In other words, it will be assumed hereinafter that the end portion 10 of the motor casing is disposed in a plane lower than the output end portion of the motor shaft designated by numeral 12.

The depending extremity or journal portion of shaft 12 is diametrically smaller than the main body portion of said shaft as shown, and is designated 14. A thrust collar 16, preferably though not necessarily of bronze, is associated with said reduced journal portion to rotate therewith.

The thrust collar may be rigidly secured to journal portion 14 by a setscrew or the like, or, as the drawing demonstrates, the connection may comprise a pin imbedded partially in said journal with its projecting end engaging a slot or groove in the thrust collar 16, as indicated at 18 in Figs. 1 and 2. In the latter construction, a washer 20 may be interposed between the upper surface of collar 16 and shoulder 22 of the motor shaft.

Heretofore, the lower surface 24 of thrust collar 16, in intimate contact with the upper surface of a solid or unnotched plate disposed just as that indicated generally by numeral 28, has been subjected to considerable frictional wear due to the absence of lubrication, so that replacement of worn thrust collars 16 to obviate excessive end play of motor shafts has been too frequently necessary.

In the embodiment illustrated, the plate 28 is of a generally triangular configuration, and is provided with arcuate apices adapted to extend over and be supported by an annular ledge 30 provided in casing 10 adjacent the upper open end of the shaft lubricating extension 32 thereof (Figs. 1 and 2).

That is to say, prior to the present invention, it has been common practice to interpose a plate 28 provided only with a central circular opening about shaft section 14, between the bottom face of thrust collar 16 and a mass of packing 34 contained within extension 32, as in Fig. 1. Suitable lubricant, supplied to said packing via a non-illustrated fitting or oil cup mounted in threaded opening 36, trickles through aligned openings 38 and 40 to lubricate journal section 14 and bearing sleeve 42, as is understood. In the illustrated construction, said bearing sleeve is press-fitted into a journal portion 44 integral with the casing extension 32.

It is noted that the construction thus far described is well known. Also noted, however, is that this construction provides no positive means for lubricating the bottom face of the thrust collar 16, and that the instant invention is designed to provide such means.

To this end, the invention contemplates the provision of one or more notches 46 extending radially outwardly from the generally circular central opening 48 in plate 28, as best seen in Fig. 5. Preferably, the outer ends of the notches 46 extend beyond the periphery of the journal portion 44 and the thrust collar 16, as illustrated in Figs. 2 and 3.

Furthermore, the invention provides an annular washer designated 50, and shown per se in Fig. 4. The diameter of the washer 50 is such that, when in place, the circumferential edge portion thereof will rest upon annular ledge 30, as shown in Figs. 1 and 2. The washer 50 is of lightly compressed felt material, inherently resilient. Centrally thereof, a circular opening 52 is formed in said washer.

In assembling a motor incorporating the invention, hollow extension 32 is completely filled with packing material 34; washer 50 is placed in position on ledge 30 so that it is in contact with the packing material; plate 28 is next put in place followed by a cup-shaped member 51; and thereupon shaft 12 with its associated thrust collar 16 is positioned, with journal portion 14 passing through the aligned openings 48 and 50, and the undersurface of said collar 16 in contact with plate 28.

Assuming now that the motor is mounted as portrayed in Fig. 1, the attainment of the invention's objectives will be explained with particular reference also to Fig. 3.

As is well known, all electric motor shafts have a certain amount of end play, which is not objectionable so long as the motor is not mounted angularly or perpendicularly. When, however, the motor is thus mounted, this end play results in a heavy burden being imposed on thrust collar 16. That is to say, the entire weight of the rotor, not shown, plus the weight of shaft 12, must be borne by the thrust collar.

Consequently, in operation prior to the present invention, the undersurface 24 of said collar had been subjected to tremendous wear because of frictional contact with a dry plate 28.

The notches 46 which the present invention provides in plate 28, cooperating with the resilient felt washer 50, insure constant lubrication between the undersurface 24 of the thrust collar and the upper surface of plate 28. Since the notches 46 extend outwardly of the journal portion 44 and the collar 16, the lubricating portion of the washer 50 is not captured between such parts.

In other words, the weight borne by thrust collar 16 and transmitted via plate 28 to washer 50, tightly compresses the major body portion of the latter with the exception of those segments thereof which underlie notches 46. These segments, indicated 54, bulge upwardly through said notches to impinge against the thrust collar, as shown.

Since washer 50 is in intimate contact with the mass of packing 34, some of the lubricant contained in the latter is absorbed by capillary action to permeate said washer, so that the segments 54 constantly supply lubricant to the underside of thrust collar 16, as should be manifest.

It is noted that, as previously stated, the notches 46 preferably extend radially outwardly beyond the peripheral margin of the thrust collar. Thus complete lubrication is provided for all areas of the thrust collar undersurface.

In view of the foregoing, it should be manifest that the present invention provides simple and inexpensive means for effectively overcoming a problem, the solution of which has long been sought.

It is of course to be understood that modification may be made within the scope of the invention as set forth in the appended claims.

What is claimed is:

1. In a motor construction, in combination, a rotatable shaft disposed in other than horizontal position, a collar secured near the lower end of said shaft for rotation with said shaft, a rigid plate member disposed about said shaft below said collar for bearing abutment with said collar, said plate member having a main central opening for receiving said shaft, said opening being extended radially of said shaft at a plurality of angularly spaced positions around said main central opening, a plate-like member of resilient compressible oil absorbing and conducting material disposed about said shaft below said plate member for flush abutment with the lower side of said plate member, said plate-like member having a central aperture for receiving said shaft, said plate-like member being compressed under an axial load imposed thereon by said shaft acting through said collar and said plate member so that portions thereof are caused to extend axially through said radially extended openings for abutment with said collar, and means for supplying oil to said plate-like member for conduction to said collar.

2. The combination of claim 1 wherein the plate member and the plate-like member have relative peripheral outlines which leave peripheral portions of the plate-like member uncovered by the plate member, whereby oil thrown radially from the collar may be reabsorbed by the plate-like member.

3. The combination of claim 2 with the addition of an annular cup-like member disposed radially about said collar for deflecting oil thrown by the collar to the uncovered peripheral portions of the plate-like member.

References Cited in the file of this patent

UNITED STATES PATENTS

| | | |
|---|---|---|
| 2,318,114 | Tichvinsky | May 4, 1943 |
| 2,519,948 | Willits | Aug. 22, 1950 |
| 2,571,672 | Bradley | Oct. 16, 1951 |

FOREIGN PATENTS

| | | |
|---|---|---|
| 403,561 | Great Britain | Dec. 28, 1933 |